United States Patent [19]

Galati et al.

[11] Patent Number: 4,843,397

[45] Date of Patent: Jun. 27, 1989

[54] DISTRIBUTED-ARRAY RADAR SYSTEM COMPRISING AN ARRAY OF INTERCONNECTED ELEMENTARY SATELLITES

[75] Inventors: Gaspare Galati; Giacinto Losquadro, both of Rome, Italy

[73] Assignees: Selenia Spazio Spa, L'Aquila; Gaspare Galati, Rome, both of Italy

[21] Appl. No.: 173,727

[22] Filed: Mar. 25, 1988

[30] Foreign Application Priority Data

Mar. 26, 1987 [IT] Italy .............................. 47772 A/87

[51] Int. Cl.⁴ .......................................... H04B 07/06
[52] U.S. Cl. ...................................... 342/59; 342/354; 342/368
[58] Field of Search ................. 342/59, 175, 352, 354, 342/368, 371, 372

[56] References Cited

U.S. PATENT DOCUMENTS

| | | | |
|---|---|---|---|
| 3,314,067 | 4/1967 | Rutz | 342/352 |
| 3,678,387 | 7/1972 | Wilson | 342/352 |
| 3,702,481 | 11/1972 | Koller et al. | 342/371 |
| 3,979,750 | 9/1976 | Smith . | |
| 4,368,468 | 1/1983 | Ott et al. . | |
| 4,445,119 | 4/1984 | Works | 342/372 |
| 4,578,680 | 3/1986 | Haupt | 342/372 |
| 4,613,864 | 9/1986 | Hofgen | 342/352 |

Primary Examiner—Thomas H. Tarcza
Assistant Examiner—Mark Hellner
Attorney, Agent, or Firm—Herbert Dubno

[57] ABSTRACT

A radar system for primary and secondary airspace surveillance, and especially for the detection and tracking of moving targets, consisting of a number of elementary satellites connected to nonrigid structures and of a main satellite, which performs accurate measurement of the position and altitude of elementary satellites and real-time adaptive combination of radar signals coming from them, so as to provide a large-phased array operating in the microwave band. This system overcomes the limitations on dimensioned large space-bound antennae found in the literature, minimizing the incidence and effects of undesired echoes and interference and assuring high detection accuracy. The fact that the elementary satellites are all the same (modular) makes possible gradual assembly of the system with possible expansion in time and assures particularly high operating availability.

20 Claims, 5 Drawing Sheets

DISTRIBUTED-ARRAY RADAR SYSTEM COMPRISING AN ARRAY OF INTERCONNECTED ELEMENTARY SATELLITES

FIELD OF THE INVENTION

Our present invention relates to primary and secondary surveillance radars which are meant to detect mobile targets (such as aircraft), measure their present positions, predict their future positions and, finally, as far as possible, identify them. More particularly, the invention relates to a distributed-array radar system wherein the distributed array consists of antenna elements formed by or on an array of interconnected elementary satellites.

BACKGROUND OF THE INVENTION

Radar surveillance is used in civil fields (e.g. as an air traffic aid) and in the military field (e.g. in defense of an airspace).

The coverage of a ground-based surveillance system is limited by the horizon and by orographic constraints, particularly at relatively low altitude; a spaceborne system, by utilizing artificial satellites, is not affected by such limitations and can cover a very large area and distribute surveillance data to many users.

The main functional and operating characteristics of airspace radar surveillance, to date at an early definition stage, are highlighted in a few recent publications, such as:

(1). W. J. Caima "Space-based Radar Application to Air Traffic Control", IEEE Internal. Radar Conference, Arlington, May 6-9, 1985 (IEEE Cal No. 85 CH 2076-8), pp 312—312.

(2) E. Brookenes: "Derivation of a Satellite Radar Architecture for Air Surveillance", IEEE Eascon - 1983 (IEEE Cat. No. 0531-6863/83), pp 465-475.

(3). G. Galati, G. Losquadro "Space-based Multifunction Radar Systems: Future Tool for Civilian and Military Surveillance" 42nd Symposium of the Guidance & Control Panel of the AGARD, Brussels 10-13 June 1986, pp 31.1-31.9.

As highlighted in article 3 above, radar surveillance systems may use primary radars, secondary radars, or both primary and secondary radars. The characteristics and operation of the primary and secondary radar, which are standard systems used in international civil aviation, are well known.

Spaceborne surveillance cannot be performed by simply carrying present techniques and technologies of primary and secondary radars on board artificial satellites because of two types of problems, both due to the very large distance (in the order of thousands of kilometers) between the radar antenna and the targets to be detected.

The first problem is that of the power required to be transmitted, particularly high for the primary radar, because the product of the square of the antenna effective area and power transmitted is proportional to the fourth power of range.

Therefore the need arises for a high-power transmitter and for an antenna with a very large effective area, or in other words, having high gain.

The second problem is that of the very high angle-accuracy required to achieve accurate location at long range, comparable to that achievable with ground-based systems operating at much shorter ranges. This last requirement too needs an antenna with a very narrow main lobe, and therefore very high gain.

The dimensions of antennae with such performance characteristics are particularly large (ranging from a few hundred to a few thousand times the radar operating wavelength). The radar operating wavelength is set by operating and mission requirements for the primary radar and is typically between 10 and 25 cm, and by International Civil Aviation rules for secondary radars, known as SSRs, set at 17.5 cm and 29.1 cm.

Previous techniques attempted to solve, at least partly, these problems by means of physically large antennae, unfoldable in space in differing configurations. Mechanical and electrical aspects make the use of such antennae very critical and pose a limit to the maximum dimensions obtainable, fixed at a few tens of meters per side, which does not provide complete satisfaction.

OBJECTS OF THE INVENTION

It is the principal object of the present invention to provide an improved radar system which overcomes drawbacks of earlier radar systems, especially with respect to the size of a phased-array of antennae elements and the power required to drive a phased-array antennae system.

Another object of our invention is to provide an improved radar system which allows coverage of the air space over exceptionally large areas and, in appropriate cases, global airspace coverage for civil aviation and defense purposes.

It is also an object of this invention to provide an improved radar system which is especially effective for the detection and monitoring of moving targets.

SUMMARY OF THE INVENTION

These objects and others which will become apparent hereinafter are attained, in accordance with the invention by providing a phased-array antennae system in space with a respective antenna element on each of a plurality of satellites, hereinafter referred to as elementary satellites which are coupled together to form the array and are managed by a main satellite which transmits the target information, processed or unprocessed to the ground station.

The elementary satellites and the main satellite are provided with communication means allowing the radar signals from the elementary satellites to be transmitted to the main satellite and treated as individual signals akin to those of standard phased-array antennae elements for processing at the main satellite or the ground station for target acquisition and detection, especially of moving targets.

The radar system for primary and secondary surveillance of an air space, according to the invention and in greater detail thus can comprise:

a plurality of elementary satellites spaced apart in a distributed array in space and each provided with:

an antenna element forming with the antenna elements of the other elementary satellites of the distributed array a phased array antenna of an area corresponding substantially to the area of the distributed array of elementary satellites, receiver means connected to the antenna element for receiving radar signals from the airspace, transmitter means connected to the antenna element for transmitting radar signals into the airspace, and communication means for receiving signals for controlling the element and transmitting radar signals from the elementary satellite;

a main satellite spaced from the distributed array of elementary satellites in space and provided with communication means in communication with the communication means of each of the elementary satellites for transmitting signals for controlling the antenna element thereof and for receiving radar signals ransmitted from individual ones of the elementary satellites; and a ground station in wireless communication with the main satellite for receiving radar information from the main satellite corresponding to the radar signals received thereby and transmitted from the individual ones of the elementary satellites.

The system can further comprise:

means interconnecting the elementary satellites in a generally planar array of polygonal outline to form a nonrigid structure with the elementary satellites;

a plurality of tension segments connected to the array and connected to the nonrigid structure to apply tension thereto;

a plurality of pulling satellites connected to the tension segments and exerting outward force on the nonrigid structure; and dampers connected between satellites of the nonrigid structure for damping oscillation of the satellites of the nonrigid structure, the pulling satellites being provided with:

attitude and orbit control means for positioning the nonrigid structure in space, and communication means connected to the attitude and orbit control means and receiving control signals from the main satellite for operating the attitude and orbit control means.

The main satellite may also be connected to the nonrigid structure as a pulling satellite.

Preferably the main satellite further comprises:

circuit means for combining the radar signals received from the individual ones of the elementary satellites coherently and adaptively so as to synthesize the phased array;

an antenna beamforming processor connected to the circuit means for generating an antenna beam pattern; and a beamforming command generator connected to the antenna beamforming processor and to the communication means of the main satellite to attenuate sidelobes of the phased array and maximize a signal-to-noise ratio thereof.

Each of the antenna elements of an elementary satellite can itself consist of phased-array antennae.

This invention thus overcomes the limitations of prior space-borne antennae by the use of a radically innovative concept, namely the use of a multiplicity of modules orbiting around the Earth and referred to herein as elementary satellites, each operating as an element of a phased array having very large dimensions.

Each elementary satellite is provided with an antenna, a transponder and a communications subsystem interfacing with the main satellite.

The main satellite, which may be duplicated to increase the availability of the entire system, and the accessibility of the antennae to a ground-based acquisition system upon failure of one main satellite, provides for coherent combination of the radar signals coming from the various elementary satellites. Hence an antenna with a radiating pattern having a very narrow main beam is obtained, comparable with that of a single-unit antenna of the same area spanned by the elementary satellites.

The result is a distributed array antenna suitable for use with primary and secondary radars. The application, at least at the conceptual level, of a distributed array concept to the primary radar, with reference to the multistatic case, where transmitters and receivers are located at different points, is described in a recently published work:

(4) R. C. Hermiller, J. F. Belyea P. G. Tomlinson: "Distributed Array Radar", *IEEE Transactions on Aerospace & Electronic Systems*, Vol. AES-19, No. 6, Nov. 1983, pp 831-839.

For application to Air Space Surveillance, monostatic operation is preferred (see reference (2) as an example) and a much larger than unity ratio (of the order of 100:1) between array area (i.e. the area over which the elementary satellites are distributed) and the sum of the areas of the array elements is required.

Under such conditions the concept of distributed array as shown in reference (4) is not conveniently applied, as it would give way to an excessive degradation of the undesired lobes of the resulting radiating pattern. Such lobes are mainly a consequence of the thinned array, i.e. because the ratio of the array area to the sum of the array element area, as defined above, is much greater than unit.

This invention eliminates this obstacle by relying upon the concept, well known to experts in array antennae and in systems using them, that the radiating pattern of an array is the product of an element factor (radiating pattern of the single element of the array) with an array factor (which is a function of the number and location of elements in the array alone).

With previous state of the art, the array elements were very simple (such as dipoles) and their radiating pattern, almost constant within a wide angle, was not predictable.

By contrast, the elements used in this invention can be complex antennae, which themselves, i.e. individually, may also preferably be phased-array antennae, or at least have predictable radiating patterns.

The elementary antennae can direct the beam (the main lobe of their radiating pattern) in an assigned direction and:

(a) can generate adaptively very low gain values (so called nulls of the radiating pattern) in a number of assigned directions, about equal to the number of elementary radiators making up the antenna, preferably outside the main beam; or (b) may have very low gain values in all directions outside the main lobe.

To attenuate, or as commonly said, to suppress the undesired lobes within the main lobe of the elementary satellite antenna (and therefore of the element of the distributed array), this invention makes use of the concept of adaptive generation also at the distributed array level.

The concept of adaptive generation of nulls and, more generally, adaptive shaping of an antenna radiating pattern, is described in many papers, among which the following:

(5) J. W. R. Griffiths "Adaptive Array Processing: A Tutorial" *IEEE* Proceedings Vol. 130, Pts. F and H, No. 1, February 1985, pp. 3-10.

In this invention, the decision as to which undesired lobes to suppress is made by the main satellite processor on the basis of the following data:

(a) Ratio between the level of each lobe and the level of the main lobe of the radiating diagram of the distributed array.

(b) Reflectivity of the region of the Earth's surface in the field of each lobe (clutter map).

(c) Geometry (range and dimension) of the radar resolution cells which encompass the surface areas above.

This information is contained in the main satellite control computer. The data (a) are measured periodically on the ground through measurement of one-way radiating pattern, while the data (b) and (c) are updated on board by a calibration device, consisting of two sections. One of these sections is a passive section utilizing transmitters at known locations on the surface of the Earth and in the frequency bands in which the space-borne radar system operates, providing accurate geometric calibration. The other of these sections is an active section, which measures the level of the radio echo (clutter signal) coming from various positions of the surface of the Earth.

A further datum which the central computer of the main satellite needs to generate the radiation pattern of the distributed array is the geometry of the array itself. This geometry is controlled, within tight tolerance, by a nonrigid structure, preferably using wire, which prevents the elementary satellites from dispersing due to effects of various origin (differences in orbit velocity and gravitational field, solar wind, etc.).

Suitable dampers are provided to limit structure oscillations. The elementary satellites are mechanically connected to or in such a structure, which takes the shape of a generally planar flat network which is held under tension by suitable satellites, called "pulling satellites", equal in number to and at the vertexes of the polygon forming the network.

The main satellite is preferably sited on an axis perpendicular to the network plane and can be mechanically attached to it (preferably by wire). It may also operate as a self-pulling satellite.

The satellite-pulling forces and their resulting momentum are null, or such as to make the requrred corrections to the orbit and/or system attitude.

This control is centralized by the main satellite, where the entire system geometry is known at all times (i.e. is stored in the computer). Accurate satellite-position measurement, by the main satellite, is obtained preferably by means of lesser telemetry.

For this purpose, each elementary or pulling satellite has three laser retroreflectors, i.e. plates of a material which has a much higher reflecting capacity than the rest of the satellite surface.

A laser telemeter, built according to known criteria and fitted to the main satellite, is trained upon the retroreflectors so as to provide three extremely accurate range measurements, from which the on-board computer can obtain position and attitude of each elementary satellite.

Aiming of the laser telemeter is facilitated by using the angle between the elementary or pulling satellite and the main satellite, the latter obtained through the measurement of the angles of arrival of the communications-subsystem carrier between satellites (inter-satellite link).

In a preferred implementation of this invention, such subsystem is optical; the theory and applications of optical techniques and technologies for data transmission are illustrated by many works, including:

(6) R. M. Gagliardi, S. Karp; Optical Communications, J. Wiley & Sons, 1975.

However the use of optical signals in positioning satellites or ascertaining such positions and as the data link for radar signal transmission in space does not appear to be described in literature. The advantage of optical transmission, preferably by means of laser are:

very high directivity, extremely wide-band high-channel capacity, and low weight and small dimensions.

Within this invention, the inter-satellite link provides exchange of the following data (as a nonlimiting example): From main satellite to elementary satellite:

(a1) waveform to be transmitted;

(a2) commands for active-beam forming; and (a3) auxiliary signals and data (for synchronization, control & satellite functional check).

From elementary satellite to main satellite:

(b1) radar echo (and/or SSR reply); and (b2) status and diagnostics data.

From main satellite to pulling satellite:

(c) data for orbit and attitude control.

From pulling satellite to main satellite:

(d) status and diagnostic data.

According to a feature of the invention, use can be made of a conventional radio link, at the same radar frequencies or at shifted or submultiple frequencies, to transmit the waveform which (following multiplication or frequency shift) is amplified and phase-shifted in the elementary satellites. The radio link may also be used in this configuration for the transmission of the data (a2) and (a3).

The secondary satellite radio-receiver antenna has a sufficiently high directivity and front-to-back ratio to avoid any effect on the radio transmission by the radar signal transmitted when a submultiple frequency is not used.

In this way, the combination of radar signals coming from elementary satellites is suitably implemented in radio frequency terms at antenna level. Finally, the main satellite is equipped with a data link operating toward one or more ground stations for the exchange of data required for control and calibration and for transmission toward the ground of the radar data, processed to the most suitable degree.

This link may be implemented using conventional techniques. Preferably radar data is processed on board, so that the "track messages" are transmitted toward ground, including, therefore, position, speed and possible auxiliary information related to the targets observed.

According to a feature of the invention, the radar signal is processed and information is extracted within the ground station. This does not reduce the advantages of the invention although it may call for a greater capacity of the transmitting link toward ground which, however, is compatible with the present state of the art.

This invention may be used for primary, secondary and both radar surveillance. Furthermore, it may be used for the selective type of secondary radar, known as SSR Mode S, which further to the surveillance function, provides transmission and from the surveilled aircraft, as is well known to experts and users of radar surveillance and of air traffic control systems.

In one embodiment of the invention, the well known monopulse technique is used to improve angle-measurement accuracy, especially under the condition of very low number of radar echoes or SSR replies coming from each target.

This situation is particularly true for the above-mentioned SSR Mode S.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
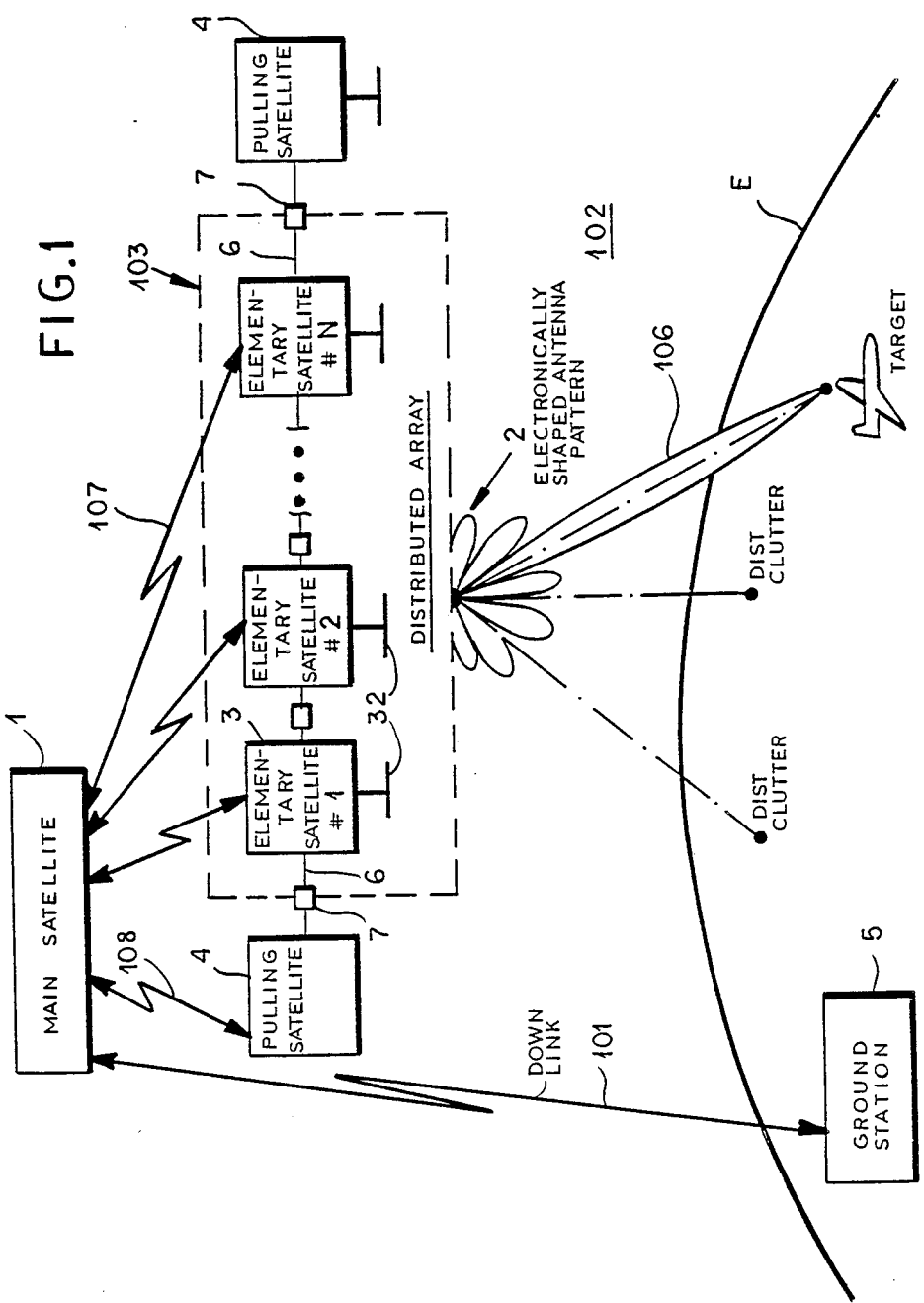
FIG. 1 is a diagram, particularly in block form, showing the main elements of a radar system of the invention in which the principal lobe is in the process of torque acquisition with respect to a moving target such as an aircraft shown flying above the curved Earth.

FIG. 1 shows the ground or Earth at E which is provided with a ground station 5 connected by a downlink 101 with the main satellite 1 which can be in a geosynchronous orbit together with the remaining satellites to be described, above the airspace 102 under surveillance.

While the main satellite 1 has been shown to be associated with only one distributed array 103 of elementary satellites, in practice each main satellite can be used to service or manage a plurality of such groups of elementary satellites or distributed arrays. In another alternative, a single ground station can be in communication as a number of main satellites 1, each managing a single distributed array or a group of distributed arrays so that, with appropriate positioning of the distributed arrays, global or space surveillance, or substantially global airspace surveillance can be provided.

Figure 2:
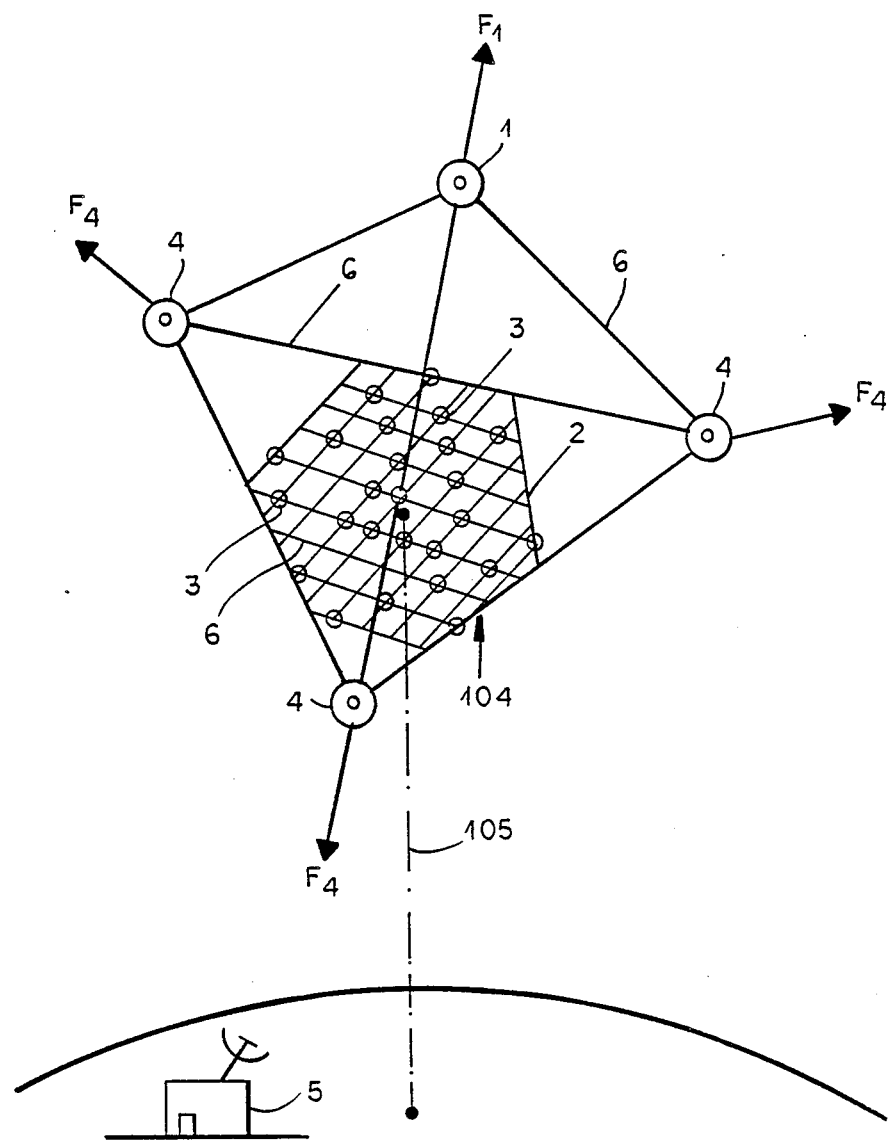
FIG. 2 is a diagram illustrating the satellite array and the relationships of the pulling and main satellites to the elementary satellites, diagrammatically showing the pulling forces applied to the nonrigid structure.

Each distributed array 103 forms a phased-array antenna and consists of a plurality of identical elementary satellites 3 of a number up to N as illustrated in FIG. 1. These elementary satellites are interconnected by segments 6 which can be wires into a nonrigid structure better seen in FIG. 2 and represented by the reference numeral 104 as a whole, the nonrigid structure being generally planar. The elements 6 also form tensioning wires holding the array taut and extending along sides of a polygon (FIG. 2).

The antennae 32 of elementary satellites 3 each form an element of the phased-array antenna 2 and themselves may constitute phased-array antennae.

At the vertices of the polygon forming the nonrigid structure 104, pulling satellites 4 can be provided. These satellites can be provided with ion motors forming effectors for orbit and attitude control of the system as will be described. The pulling satellites exert forces $F_4$ maintaining the wires 6 under tension. In the embodiment as shown in FIG. 2, the main satellite 1 likewise is provided with an ion motor and serves as a pulling satellite, applying tension in the direction of arrow $F_1$. The dot-dash line 105 in FIG. 2 represents the axis of the principal lobe 106 (see FIG. 1) of the electronically-shaped antenna pattern.

The communication links between the main satellite and the elementary satellites are represented at 107 and may be radial links, other wireless links such as optical communication links, or wired links as will be described. The communication links between the main satellite and the pulling satellites is represented at 108 in FIG. 1 and may be similar to or different from the communication links between the main satellite and the elementary satellites.

While the operations of the circuitry in the various satellites will be developed in greater detail below, as an overview it may be noted that the main satellite 1 (FIG. 3) comprises a receiver/transmitter unit 8 for the ground-data link 101 and is connected to a central computer 13 which can have a map memory 14.

If radar-data extraction and radar-signal processing are carried out in the main satellite, then the receiver 17 forming part of the communication means with the pulling and elementary satellites, is connected to a decoder 11 which delivers the torque acquisition radar-signal information to the radar-signal processor 10 and the radar-data extractor 9 for transmitting torque information to the ground station by the downlink 101.

Of course, units 9 and 10 may be provided in the ground station as an alternative.

The central computer 13 is connected to an antennae pattern-forming computer 22 and a radar-management processor 29 and to the radar-data extractor 9.

The radar-management processor is connected to a control and synchronism generator 27 and a wave-form generator 390 while the antenna pattern-forming computer 22 is connected to a beam-forming command generator 25.

A coder 27 connected to the transmitter 28 forming part of the communication means with the elementary and pulling satellites receives inputs from a stable oscillator 15, an orbit and attitude-control unit 24 and the units 25, 26 and 30.

The orbit and attitude control 19 operates ion motors and other position actuators 18 and a laser-pointing unit 20 is connected to a laser telemeter 21 transmitting the laser beam 2 and receiving the laser beam from retroreflectors of the elementary satellites 3.

Figure 4:
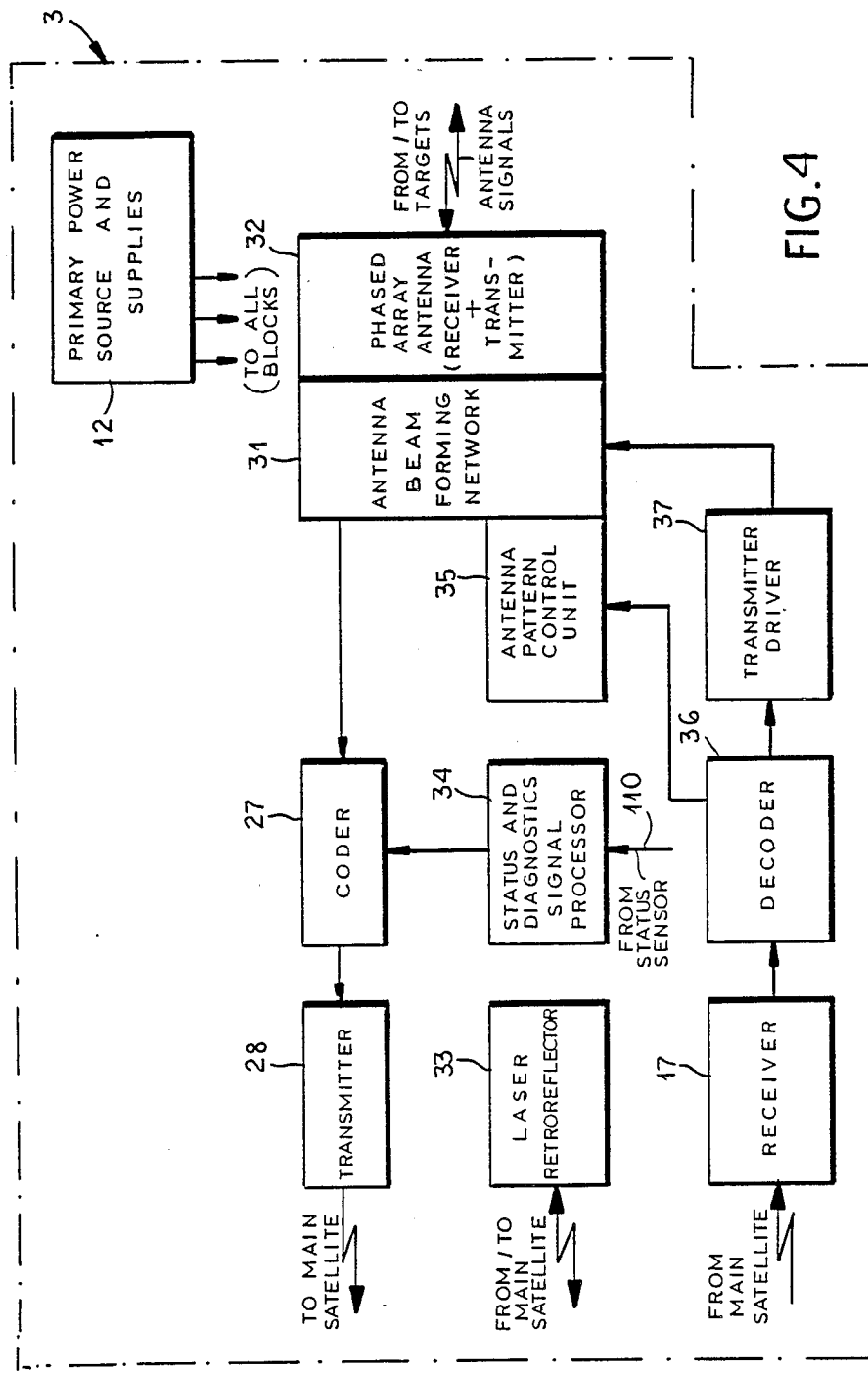
FIG. 4 is a block diagram of one of the elementary satellites which are modular in construction and can all be identical.

Each elementary satellite 3 (FIG. 4) in turn has a receiver 17 forming a communication means as described for receiving signals from the main satellite and connected to a decoder 36 which works into a transmitter driver 37 for the radar-signal transmission. The transmitter driver 37 is coupled to the antenna beam-forming network which is provided with phased-array antennae element 32 for radar-signal transmission and reception.

The elementary satellite 3 also has a laser retroreflector 33 cooperating with the laser telemeter for position determination. A status sensor 110 is provided for the status and diagnostics-signal processor 34 which outputs to a coder 27 connected to the transmitter 28 delivering the status and diagnostics results to the main satellite.

An antenna pattern-control unit 35 is connected to the decoder 36 and responds to electronic signals received from the main satellite to control the antenna pattern as alluded to earlier and described more fully below.

Each pulling satellite 4 (FIG. 5) has a laser retroreflector 33 for position determination and a receiver 17 and transmitter 28 as described in addition to the status and diagnostics signal processor 34. However, it also has ion motors 18 and other effectors controlled by an orbit and attitude-control unit 38 responding to signals received from the main satellite as well as to signals from orbit and attitude sensors 111 on board the pulling satellite.

Figure 5:
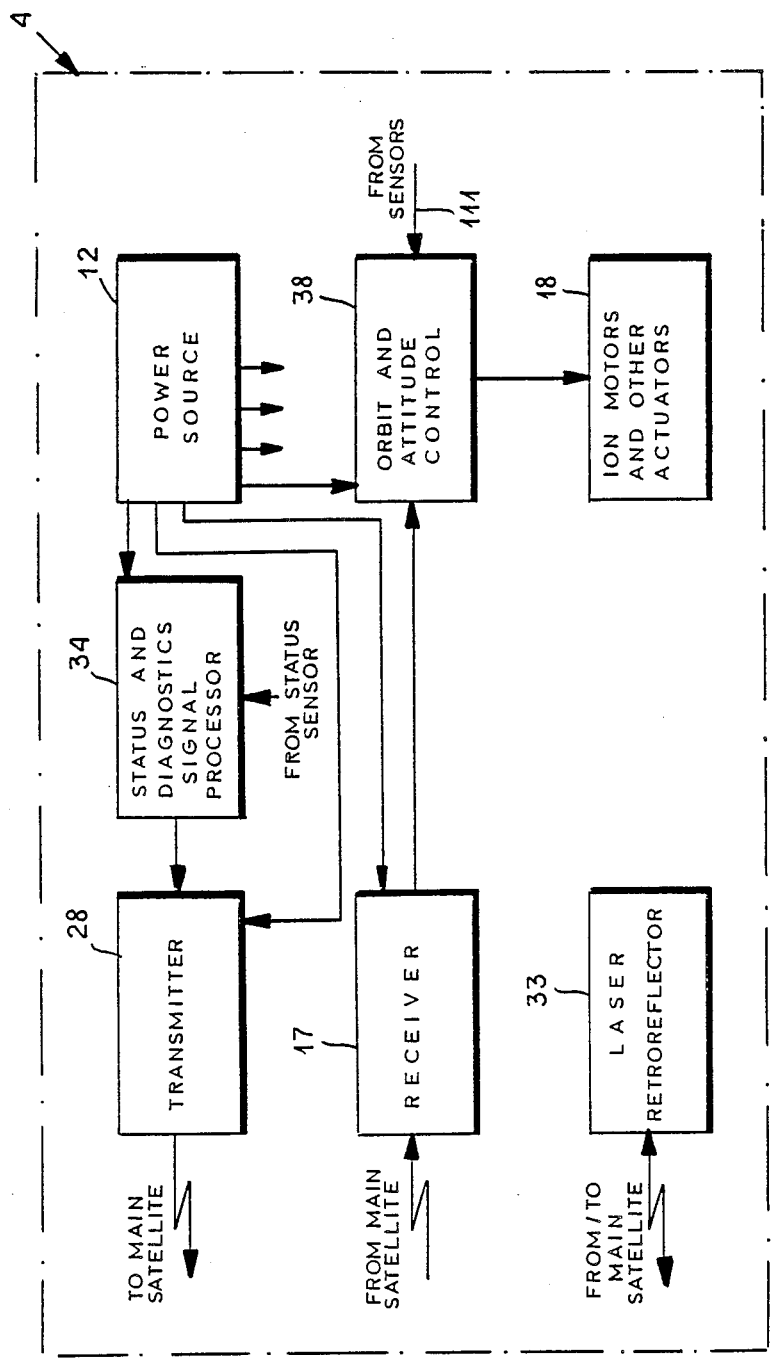
FIG. 5 is a block diagram of a pulling satellite.

FIG. 5 finally shows a pulling satellite 4 in its preferred general configuration in block form. This satellite includes functional blocks identical to those present in the other satellites shown above, and in addition, block 38 which is an orbit and attitude control which is managed by the main satellite.

Depending upon the operating mode selected by the central computer 13 of the main satellite (FIG. 3), the management processor 29 of the radar system sends suitable commands to the control and synchronism generator 26 and to the transmitted waveform generator 30. Control signals synchronizing signals and waveforms are coded (in coder 27) and transmitted to all elementary satellites, simultaneously via the transmitter 28 and a wired or wireless link.

In parallel, as a function of surveillance requirements and of the related environment, the central computer 13 sets the aiming direction of the beam via the antenna pattern-forming computer 22 and the beam-forming command generator 25.

Furthermore, as a function of data (a), (b) and (c) described earlier and contained in memory 14, the central computer 13 establishes the strategy for the suppression of sidelobes.

Such data (pointing direction and suppression strategy) are sent to processor 22 which also receives precise information on the elementary satellite position from processor 23. On the basis of such information, processor 22 calculates the coefficients required for beamforming. These coefficients are converted into suitable commands by generator 25, coded by coder 27 and sent to the elementary satellites by transmitter.

Receiver 17 of each elementary satellite 3 (FIG. 4) sends the commands received from transmitter 28, decoded by decoder 36, to another control unit 35 which completes processing and actuates commands acting upon the beamforming network 31 adapting the phased-array antenna 32 in transmission and in reception.

During transmission, the waveform is decoded at 36, suitably amplified by the transmitter driver 37 and sent to the transmitter section of the antenna 32. Later on, the radar echo (and/or SSR reply) coming form the target is received by the antenna 32 of each elementary satellite, where the radiation pattern is formed by network 31. The resulting radar signal is coded by coder 27, which, in the preferred implementation, is of the optical type.

The latter signal is received by receiver 17 which preferably is also of the optical type of the main satellite 1 (FIG. 3) and sent to decoder 11 which uses the reference oscillation of the same stable oscillator 15 used for transmission coding in coder 27 of the main satellite.

The decoded radar signal is then transferred to processor 10 where noise filtering takes place (so-called matched filtering or a close approximation thereof), or interference filtering to remove, for example, so-called clutter and undesired signal return.

Preferably, within signal processing block 10, the combination of signals coming from various elementary satellites is effected with spatial filtering which synthesizes the distributed array.

Figure 3:
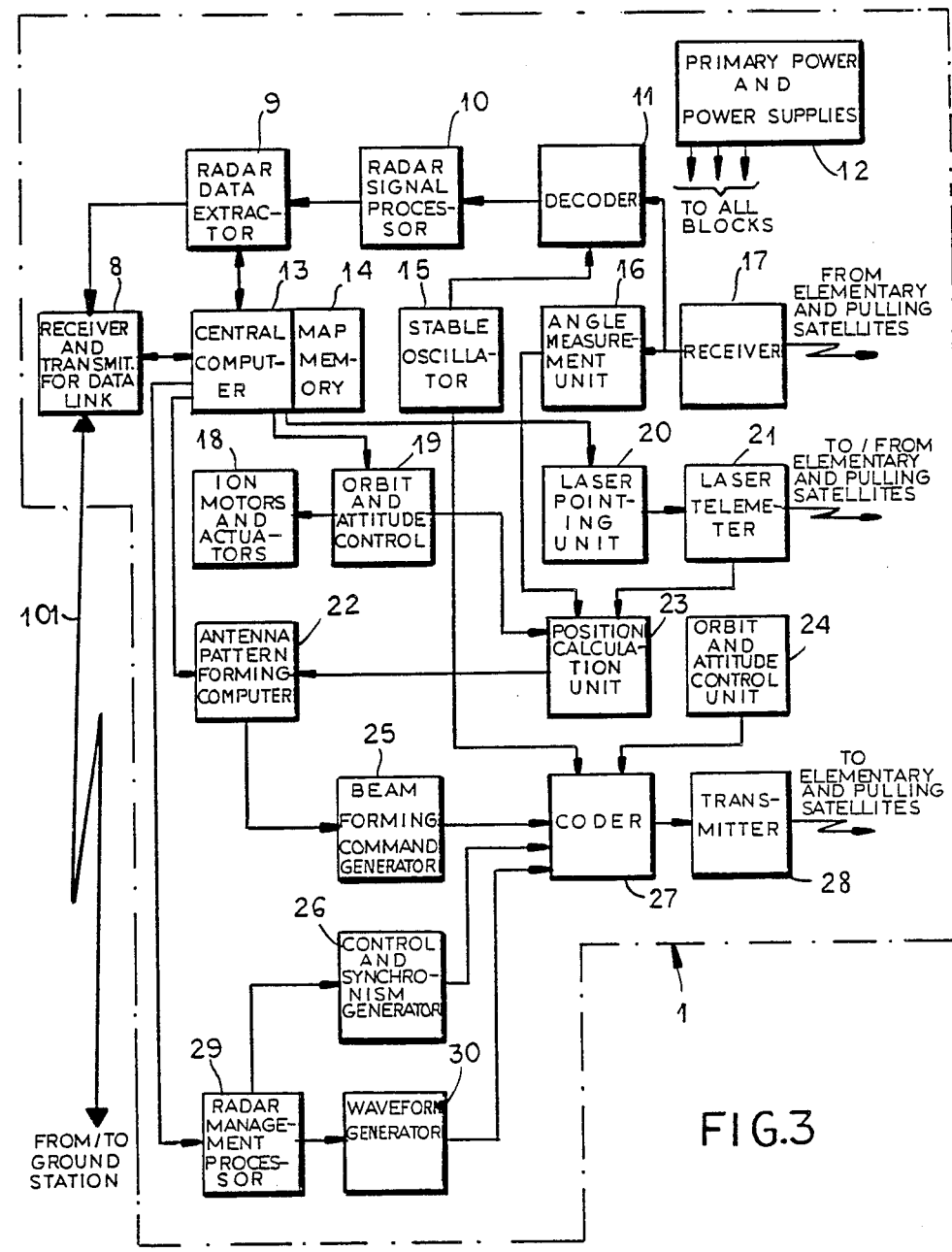
FIG. 3 is a block diagram of the main satellite.

Alternatively, this combination takes place on a radio frequency level at the antenna which forms part of the electronic receiver 17 in FIG. 3.

The data of interest to operation, relevant to targets, is obtained from the extractor 9 by means of further filtering of the radar information coming from processor 10 and later transferred to the ground station by means of subsystem 8.

Through the same subsystem 8, the information needed for beamforming and radar-system management reaches the main computer 13. The latter information, which includes type of waveform, controls and synchronisms, is processed by the management processor 29 which drives the controls and synchronisms generator 26 and waveform generator 30, the outputs of which are coded and transmitted to the elementary satellites by blocks 27 and 28.

Accurate knowledge of the distributed array geometry is obtained by means of a telemetry subsystem, which, in its preferred form of implementation, is of the laser type, where a laser telemeter 21 fitted on the main satellite is trained onto suitable laser retroreflectors 33, fitted to each elementary and pulling satellite.

Training of the lasers on the retroreflector targets is aided by an angle measurement device 16 which uses the output of receiver 17 to measure the angle of arrival of the signal transmitted by the satellite and therefore also its angular position.

The range measurement made by the laser telemeter 21 together with the angles provided by unit 16 are processed by computer 23 which determines the attitude of system satellites. This data is further processed to obtain the orbit and attitude corrections which are coded at 27 and transmitted at 28 to the pulling satellites, where they are received by receiver 17 and used by the orbit and attitude control system 38 managed by the main satellite which actuates them.

The same position and attitude data is sent to the beamforming processor 22, where, as seen above, they are used to calculate the coefficients required for adaptive beamforming.

The distributed beamforming is calibrated exploiting the radar echoes of particular points on the Earth's surface (known high reflectivity points) and using the replies sent by suitable SSR transponders set at well-known positions.

The difference between known positions (stored in main computer 13) and that measured by the radar system and transferred by extractor 9 to computer 13, is utilized by the same computer 13 to generate the correction commands, which are sent to the antenna beamforming processor 22. The difference between echo and reply amplitude and the related expected value may also be used, in a very similar manner, to check possible defocussing of the phased array and to perform the required corrections.

The main satellite has its own orbit and attitude control 19 with related actuators 18 as well as the orbit and attitude-control processor of the entire system 24 which, by means of coder 27 and transmitter 28, sends control signals to each pulling satellite, where such signals are received by receiver 7 (FIG. 5). These signals are optical, in the preferred implementation, and are sent to the orbit and attitude control subsystem 38.

Each satellite is equipped with its own electrical power supply subsystem, which includes a primary power source 12 (preferably using solar panels and storage batteries) and power supplies derived therefrom for all on board users.

Finally, the elementary and pulling satellites can transfer to the main satellite the information related to status and possible malfunctions (diagnostics), which can be hand-processed and coded by a suitable processor 27.

We claim:

1. A radar system for primary and secondary surveillance of an airspace, comprising:
   a plurality of elementary satellites spaced apart in a distributed array in space and each provided with:
   an antenna element forming with the antenna elements of the other elementary satellites of the distributed array a phased array antenna of an area corresponding substantially to the area of said distributed array of elementary satellites,
   receiver means connected to said antenna element for receiving radar signals from said airspace,
   transmitter means connected to said antenna element for transmitting radar signals into said airspace, and
   communication means for receiving signals for controlling the element and transmitting radar signals from the elementary satellite;
   a main satellite spaced from said distributed array of elementary satellites in space and provided with communication means in communication with the communication means of each of said elementary satellites for transmitting signals for controlling the antenna element thereof and for receiving radar signals transmitted from individual ones of said elementary satellites; and
   a ground station in wireless communication with said main satellite for receiving radar information from said main satellite corresponding to the radar signals received thereby and transmitted from the individual ones of said elementary satellites.

2. A radar system for primary and secondary surveillance of an airspace, comprising:
   a plurality of elementary satellites spaced apart in a distributed array in space and each provided with:
   an antenna element forming with the antenna elements of the other elementary satellites of the distributed array a phased array antenna of an area corresponding substantially to the area of said distributed array of elementary satellites,
   receiver means connected to said antenna element for receiving radar signals from said airspace,
   transmitter means connected to said antenna element for transmitting radar signals into said airspace, and
   communication means for receiving signals for controlling the element and transmitting radar signals from the elementary satellite;
   a main satellite spaced from said distributed array of elementary satellites in space and provided with communication means in communication with the communication means of each of said elementary satellites for transmitting signals for controlling the antenna element thereof and for receiving the transmitted radar signals from individual ones of said elementary satellites;
   a ground station in wireless communication with said main satellite for receiving radar information from said main satellite corresponding to the radar signals received thereby and transmitted from the individual ones of said elementary satellites;
   means interconnecting said elementary satellites in a generally planar array of polygonal outline to form a nonrigid structure with said elementary satellites;
   a plurality of tension segments connected to said array and connected to said nonrigid structure to apply tension thereto;
   a plurality of pulling satellites connected to said tension segments and exerting outward force on said nonrigid structure; and
   dampers connected between satellites of said nonrigid structure for damping oscillation of the satellites of said nonrigid structure, said pulling satellites being provided with:
   attitude and orbit control means for positioning said nonrigid structure in space, and
   communication means connected to said attitude and orbit control means and receiving control signals from said main satellite for operating said attitude and orbit control means.

3. The radar system defined in claim 2, further comprising means connecting said main satellite to said nonrigid structure as an additional pulling satellite.

4. The radar system defined in claim 2 wherein said main satellite further comprises:
   circuit means for combining the radar signals received from the individual ones of said elementary satellites coherently and adaptively so as to synthesize said phased array;
   an antenna beamforming processor connected to said circuit means for generating an antenna beam pattern; and
   a beamforming command generator connected to said antenna beamforming processor and to said communication means of said main satellite to attenuate sidelobes of said phased array and maximize a signal-to-noise ratio thereof.

5. The radar system defined in claim 2 wherein the antenna element of each of said elementary satellites is a phased-array antenna with coefficients determined on a basis of commands received from said main satellite and selected to attenuate sidelobes of the phased array and maximize a signal-to-noise ratio thereof.

6. The radar system defined in claim 4 wherein said main satellite further comprises:
   a coder connected to said beamforming command generator for coding said coefficients;
   a transmitter connected to said coder for transmitting coded coefficients to said elementary satellites; and
   means forming an optical communications link forming part of said communication means of said main satellite and said elementary satellites and connected to the transmitter for transmitting coded coefficients to said elementary satellites.

7. The radar system defined in claim 2 wherein said main satellite further comprises:
   a subsystem for accurately measuring positions of said pulling satellites and including a processor for generating orbit and attitude control commands for said pulling satellites;
   a coder connected to said processor for coding said orbit and control commands for siid pulling satellites; and
   a transmitter forming part of the communication means of said main satellite for transmitting coded orbit and attitude commands to said pulling satellites, said pulling satellites each being provided with:

ion motors responsive to the orbit and control means of the respective pulling satellite for driving the respective pulling satellite.

8. The radar system defined in claim 7 wherein said subsystem includes:
a laser telemeter;
an angle measurement unit for training said laser telemeter on said elementary and pulling satellites, said elementary and pulling satellites each having at least one laser retroreflector cooperating with said laser telemeter; and
a position computer connected to said angle measurement unit.

9. The radar system defined in claim 2 wherein each of said communication means includes:
a receiver on the respective satellite;
a decoder connected to said receiver for decoding signals received thereby;
a transmitter on the respective satellite; and
a coder connected to said transmitter for coding signals to be transmitted thereby.

10. The radar system defined in claim 2 wherein said main satellite further comprises:
receiver antenna means collecting radar signals from targets transmitted to said main satellite by said elementary satellites and combining said radar signals collected from said said targets, said communication means on said satellites including radiofrequency transmission links.

11. The radar system defined in claim 2 wherein the frequency of said transmission links is a multiple, submultiple or shifted frequency relative to the radar signal frequency emitted by said elementary satellites.

12. The radar system defined in claim 2 wherein said main satellite further includes:
a central computer connected to the communication means of said main satellite and storing data including:
ratio between sidelobes and peak of the phased array;
reflectivity of earth surface patterns within a range of a radiation patter of the phased array; and
geometry of radar resolution cells of interest, said central computer being provided with means for updating said data based upon information received from the ground.

13. The radar system defined in claim 2 wherein said main satellite further includes:
means for combining radar signals received from said elementary satellites with coefficients synthesizing a monopulse radiation pattern.

14. The radar system defined in claim 2 wherein said ground station includes:
a radar signal processor responsive to signals received from said main satellite; and
a radar signal extractor connected to said radar signal processor for determining positions of targets detected by said phased array.

15. The radar system defined in claim 2 wherein said main satellite further comprises:
means responsive to radar echoes from earth and SSR replies of transponders on earth at precisely known locations for continuously calibrating a position of said phased array and correcting beam pointing errors thereof and defocussing.

16. The radar system defined in claim 2 connected for defence and civil-aviation application.

17. The radar system defined in claim 2 at an altitude ranging from 1,000 km above the earth to a geostationary orbit altitude.

18. The radar system defined in claim 2 which comprises a plurality of said distributed arrays located in respective orbits for continuous surveillance of substantial portion of the globe to full global coverage.

19. The radar system defined in claim 18 wherein said main satellite communicates with a group of said distributed arrays for managing same.

20. The radar system defined in claim 18 wherein each of said distributed arrays is connected to a respective said main satellite for managing the respective distributed array.

* * * * *